(12) United States Patent
Meroux et al.

(10) Patent No.: US 12,030,401 B2
(45) Date of Patent: Jul. 9, 2024

(54) ENVIRONMENTALLY SUSTAINABLE PEER-TO-PEER ELECTRICITY SOURCE NETWORK

(71) Applicant: Ford Global Technologies, LLC, Dearborn, MI (US)

(72) Inventors: Dominique Meroux, San Francisco, CA (US); Cassandra Telenko, San Francisco, CA (US); Zhen Jiang, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 17/542,209

(22) Filed: Dec. 3, 2021

(65) Prior Publication Data
US 2023/0173941 A1    Jun. 8, 2023

(51) Int. Cl.
*B60L 53/68*  (2019.01)
*H02J 7/00*   (2006.01)
*H02J 13/00*  (2006.01)

(52) U.S. Cl.
CPC .......... *B60L 53/68* (2019.02); *H02J 7/0013* (2013.01); *H02J 13/00002* (2020.01)

(58) Field of Classification Search
CPC ........ B60L 53/68; B60L 53/305; B60L 53/00; B60L 53/10; B60L 53/50; B60L 53/60; H02J 7/0013; H02J 13/00002; H02J 2310/48; Y02T 10/70; Y02T 10/7072; Y02T 90/12
See application file for complete search history.

(56) References Cited

U.S. PATENT DOCUMENTS

| | | |
|---|---|---|
| 8,138,715 B2 | 3/2012 | Lowenthal et al. |
| 10,518,655 B2 | 12/2019 | Pandhi et al. |
| 2013/0211988 A1 | 8/2013 | Dorn et al. |
| 2019/0047427 A1 | 2/2019 | Pogorelik |
| 2020/0333151 A1 | 10/2020 | Akhtar |
| 2021/0347276 A1* | 11/2021 | Lu .............. G06Q 30/0283 |

OTHER PUBLICATIONS

Power Hero, Growing Electric Vehicle Infrastructure as a Community, www.startengine.com/power-hero-corp, Jun. 28, 2021, 1-24.

* cited by examiner

*Primary Examiner* — Brian P Sweeney
(74) *Attorney, Agent, or Firm* — Emily Drake; Eversheds Sutherland (US) LLP (57) ABSTRACT

This disclosure describes an environmentally sustainable peer-to-peer electricity source network. An example method may include receiving, by a processor, a request to perform a charging of a first device. An example method may include determining, by the processor and using a peer-to-peer network including one or more charging sources, a first charging source to provide charge to the first device, wherein determining the first charging source is based on an amount of emissions that would result from charging using the first charging source. An example method may include determining, by the processor, a first time and a first location at which to perform charging of the first device using the first charging source. An example method may include determining, by the processor, that the charging of the first device has been performed.

20 Claims, 7 Drawing Sheets

ENVIRONMENTALLY SUSTAINABLE PEER-TO-PEER ELECTRICITY SOURCE NETWORK

BACKGROUND

Users increasingly want options for emergency electricity access due to trends such as wide power outages from natural disasters and conversion to electric vehicles (EVs). In blackouts, many residents may be stranded without electricity or a means to find or request electricity sources. Range anxiety and a slow buildout of charging stations, which includes challenges like station mechanical or software failures or long wait times for a spot to become available, are some reasons that have slowed the adoption of EVs. Additionally, regulators and consumers are increasingly concerned about emissions from electricity sources.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, an environmentally sustainable peer-to-peer electricity source network. Particularly, the peer-to-peer network may provide a system (that may be implemented in the form of a mobile device application, for example) that may allow users to schedule and/or otherwise access private charging sources that are made available by other users on the peer-to-peer network. For example, a user with a first EV that is low on battery charge may use the system to identify a second user with a second EV in the area. The second user may have made the second EV available as a charging source, and an indication of such may be provided on the application. The first user may select the second EV to schedule time to charge the first EV using the second EV as a source of electricity. This peer-to-peer network may also be environmentally sustainable in that emissions may be factored into determinations as to which particular charging source is used for a charging event. Although a peer-to-peer network providing charging capabilities is described herein, this is not intended to limit the network to this particular use case. The same type of peer-to-peer network may also be generalized to include liquid or gaseous fuel transfer as well. Additionally, while certain types of charging sources may be described (such as EVs, for example), these are merely examples, and are not intended to be limiting in any way.

There is a growing number of private electricity sources to which potential users may not currently have access. For example, EV owners are installing their own connected charging stations in their homes, some vehicles offer a built-in generator electricity source, and EVs are introducing bi-directional charging capabilities. To gain access to these emerging electricity sources in emergencies, users may benefit from a peer-to-peer charging network and service. Connecting a large network of users with on-vehicle electricity sources like bi-directional EVs or privately connected charging stations (for example, at user homes) would dramatically increase the charging locations available to EV users and rescue options for residents in a power outage.

A technical challenge is that adding these private electricity sources to a network may also increase emissions from vehicles if too many charging events are powered by internal combustion (ICE) vehicles with low-efficiency conversion of their fuel to electricity and on-site tailpipe emissions. Evaluating the global warming impact of the combined private and public charging network may mitigate range and climate change anxiety for users and regulators. These evaluations may serve to increase emergency electricity access while avoiding scenarios that violate low-emission zones or local air district restrictions. The peer-to-peer network may also address these emission considerations, as will be described in additional detail below.

In some embodiments, the peer-to-peer electricity network may be generally implemented as follows. A first step may involve identifying and evaluating potential charging sources, such as EVs with bidirectional charging, vehicles with an on-vehicle electricity sources, privately owned charging stations. This may be accomplished by facilitating matches based on estimates of mobility range and estimates of emissions of electricity sources and logistics to connect. These matches may be accomplished using the mobile application as aforementioned. For example, the mobile application may include a user interface that may display a listing of such charging sources, as well as information associated with the individual charging sources (additional details about this user interface may be described with respect to FIGS. 4A-4C).

Participants (for example, users whose charging sources are listed as available on the network and/or users who search for charging sources) may register and may be certified in the peer-to-peer network. Participants registering charging sources may enable access to sensors and telematics for their vehicle, which can be used to certify information about the vehicle, such as a location of the vehicle, emissions information, and capabilities of the vehicle, such as charging capabilities. Other types of information may also be provided if the charging source is not a vehicle (for example, a charging outlet installed in a home). Participants registering other private electricity sources may register to a database, supplying information such as proof of ownership, technical specifications of the charging source, and installation which can be used to certify location, emissions, and capability (for example, solar installations, renewable energy power plans).

The users may also provide access or connection to environmental sensors, such as home security sensors in addition to access to charging sources. For example, if the charging source is a charging outlet located in a garage of a home, a user that selects this charging source may need access to the inside of the garage in order to access the charging outlet to perform the charging. Participants also register additional identity and background confirmation as needed for safety and proof of ownership checks. Participants can use level of certification to choose peer connections. Distributed ledger technologies, such as Blockchain or other tracking technologies, may be used in some cases to enable trusted transactions between two parties that may not know each other as well as potentially a third party like a government mobile or stationary emissions sources regulator for fleets and/or automotive OEMs.

A more comprehensive description of the operation of the peer-to-peer network may include the following. First, a user in need of a charging source may be matched with an available charging source, for example through a mobile or web application. Participating entities may include, for example, a connected vehicle service hosted in the cloud, the charging source provider, whether an owner of a vehicle with an on-vehicle electricity source or owner of a connected charging station, and the electricity source user, whether it be an EV owner or a party in need of electricity for another use. Reservation and/or selection of the electricity source may be made by the user in advance of the schedule charging time. The use case or amount of power desired (for example, in units of kWh) and price information may be computed in advance of the allotted time for the charging session as well. For example, this information may be calculated using vehicle telematics or other registration information (for example, home size, devices to be powered, etc.).

Participants can also indicate their willingness and ability to travel in addition to sensor-based capability assessments (for example, estimating energy/time required from vehicle sensor and traffic and routing data). That is, the party providing the charging source may indicate that they are willing to travel to the requesting user to provide the charging source (for example, drive a vehicle providing the charge to a vehicle that requires charging). That is, the charging event may be scheduled such that the charging source may travel to the user who scheduled the charging source, and/or the user may instead travel to the location of the charging source. Depending on autonomous capabilities, the transaction may be performed between two autonomous entities with no human involvement needed. That is, the application may alternatively provide an indication that an autonomous vehicle serving as a charging source may autonomously travel to a location to perform charging.

For areas where an internet connection may be unavailable (for example, in an unpopulated area, or in scenarios where weather or other events cause a massive infrastructure outage), near-range technologies may be able to facilitate the connections and transactions where information is exchanged with the cloud when either party is back in a region with cellular service. Examples of such near-range technologies include Bluetooth, DSRC, cellular technologies like 5G implemented to be able to skip cell towers, and/or others. The participating parties and mobile devices can participate, enabling the mobile application to function with stored parameters. Network information may be stored locally in a vehicle or mobile device similar to downloading maps in GPS routing.

Additionally, in some cases, all or some of the charging processes as described herein may be automated. For example, both parties involved in the transaction may have sensors that can be leveraged to obtain information about the surrounding environment, including the presence of individual(s) and their actions. Such sensors may include, for example, camera, Radar, Lidar, sound and temperature, vehicle door sensors, etc. During a charge event, these timestamped sensor streams may be recorded to be subsequently stored for a designated period for retrieval in the event of a conflict. Entry of the user into a designated distance and time from the charger would automatically trigger relevant sensors to begin recording.

In some embodiments, a specific protocol for a given charging event may be required by all parties. Such protocols may be applicable to all scheduled charging events and/or may be manually configured by different users. For example, a user may be instructed to either remain in their vehicle or to leave/stay away from a designated "private property" zone. As a second example, the owner of the connected charging station or vehicle with an on-vehicle electricity source may be required to not be present during charging. The presence of other surrounding individuals or entities could be classified and tracked while in the vicinity. Whether the user might appear to be having a medical emergency could be classified. In some cases, classification algorithms may be used to identify whether any aspect of the transaction is out of the norm. A classification of such a problem may trigger alerts to relevant authorities and relevant parties. In some cases, one or more elements may exist for an individual present to alert an emergency. Examples of such elements may include, for example, a physical button, a voice command, a unique and discrete way of signaling an emergency only known to the individual, a mobile app icon, etc.

At each stage of a charging transaction, data may be collected and stored regarding the transaction and/or any events that may occur during the transaction. The transaction record may be logged by multiple entities for consensus, including at a minimum the two connected entities involved locally (vehicles, vehicle and connected charger, etc.), the cloud, and any mobile devices (for example, cell phones). Any other compatible or nearby passing devices may be included as well. If hash values in the Blockchains do not match at any point, the event may be flagged and a relevant backup implementation used, or annulation of the charging event, or emergency services sent if an on-site problem is suspected.

As aforementioned, the peer-to-peer network may not only serve to connect users requiring charging sources with available charging sources, but may also mitigate emissions produced as a result of these charging events. In some cases, this may involve the identification of fuel pathways used to provide an estimate of emissions from a charging event, for example, emissions from electricity sources like a power generator source. This could account for renewable energy program electricity sources or on-site solar, or purchased carbon abatement credits, for example. In some cases, the system may maintain a record (one such example implementation is Blockchain) for compliance and sustainability reporting. Emissions records can be used for fleet compliance for example with local air district regulations for stationary or mobile emissions sources, automotive OEM compliance for example in support of an off-cycle credit application, or simply providing sustainability metrics to an environmentally conscious user. Compliance may include the ability to authorize only those vehicles compliant with any relevant emissions regulation to support tasks like EV charging. For example, a flex-fuel hybrid with an on-vehicle electricity source may only be authorized when ethanol fuel percent is above a certain threshold (lower localized tailpipe emissions), or weather conditions mitigate smog formation potential, or when a plug-in hybrid has enough state of charge (SOC) to support the power transfer on EV Only mode (zero localized emissions).

The system may estimate the emissions of available electricity sources within the network and within an energy or distance range of the power consumption. The energy required for service may include energy transmitted between parties, which may account for efficiency losses between energy transmitted and energy received by the end-user. Well-to-end use emissions represents one embodiment of assessing impacts. Other impacts may include, for example, impacts on other environmental categories (e.g. water, land use, resource availability, carbon and criteria emissions), degradation impact on various parts including battery degradation, and maintenance events. A life cycle analysis (LCA) or costing (LCC) may be computed. In some cases, well-to-end use emissions may be calculated as: well-to-end use emissions=(Well-to-Storage [g/J]+Local Exhaust Emissions [g/J])*Energy Required for Service [J].

In some embodiments, emissions may be determined using a well-to-storage (WTS) emissions database. A refueling or charging station owner, or owner of a private connected charging station, may be able to upload information to a database on the fuel pathway corresponding to their fuel or electricity. If this information is unavailable, the database may also store default regional values such as US Department of Energy or national laboratory assumptions or CA ISO emissions estimates associated with the power grid at a given time and a given region. This information may be displayed in the mobile application for both existing public charging infrastructure (for example, in the application as an additional data source for EV charging and fuel stations for other fuel types) and our proposed peer-to-peer electricity network. This may encourage users (and electricity source providers) to offer the greenest fuel pathways possible.

As examples, a refueling station may identify its fuel pathway and includes this information in the database. For example, a hydrogen fuel station may indicate that its fuel pathway comes from a fuel pathway where emissions have been documented according to government standards. A public electric charging station may contain information on its fuel pathway. For example, perhaps the electricity is associated with a green electricity program from the local utility, or the driver can opt into that program for their charging session. As another example, an on-site solar array may produce a certain percentage of electricity for that station. Yet another example is an on-site solar array provides 100% of the electricity. A private housing (single-family home or multi-unit dwelling) electricity source owner may be able to enable their utility to share that the housing unit(s) have enrolled in a renewable energy program, or have solar power covering some portion of their electricity needs. Alternatively, the private housing electricity source may provide proof they have an off-grid power system along with the electricity mix supporting that setup (for example, solar and battery storage).

In some embodiments, the well-to-storage (WTS) emissions of current energy stored may be calculated. In some cases, the WTS may be calculated using Equation 1 presented below.

$$WTS = (Old\ WTS * Energy\ Remaining) + (New\ WTS * Energy\ Added) / Energy\ Remaining + Energy\ Added \quad \text{(Equation 1)}$$

In some embodiments, the emissions may also include local exhaust emission calculations. These calculations may determine whether the electricity source is authorized given regulations that may be location or time-dependent. If a home is being powered by a generator at a given time and charging an EV, that pathway may include local exhaust emissions. For vehicles, in some cases, compliance may depend on whether there are any controls requirements that can be applied (E.g. PHEV supporting charging on EV mode only, or a bi-fuel vehicle supporting charging on the cleaner-burning fuel only). The following calculations may also be made during the charging event: cumulative energy (kWh) required by the EV or home or device (requestor may select minimum utility), cumulative energy spent by both parties (for example, to reach meeting point), and using both values, energy transmission losses. Relevant ambient conditions may be obtained from vehicle sensors, for example, one or more of ambient air temperature, atmospheric pressure, humidity, wind, and solar intensity. For each available sensor, if available use sensor data from nearby modem-connected vehicles and any available external data sources to validate sensor readings and either flag or compute a corrected value if value heterogeneity exceeds some threshold. Relevant fuel information may also be obtained, for example, stationary charger grid source or fuel type(s) of vehicle. Any relevant emissions monitoring (for example, catalyst temp.) and fuel consumption data. For flex-fuel vehicles, alcohol fuel percentage may be determined. For bi-fuel and dual fuel vehicles, the share of gaseous fuel consumed and share of liquid fuel consumed while internal combustion (ICE) engine is on may be determined. For electrified vehicles, for example, hybrid or plug-in hybrid, a share of charging supported with traction battery switched on and zero exhaust may be determined. In addition, contribution to long-term traction battery degradation may be calculated. For vehicles with additional electricity sources supplying the vehicle, for example, a solar panel truck bed cover, a share of charging supported by this electricity source may be calculated. For private home or business chargers, renewable power plan information, local grid mix, or private energy installation may be determined.

In some embodiments, the emissions considerations may also involve the following. In some cases, the system minimizes detours for participants. In examples where both electricity source and requester are vehicles, an owner may indicate the next destination or sets status as "stationary" if parked. A private owner or fleet may also take this information from routing software, including the in-vehicle navigation system, and/or telematics. The system may assess alternative power options within a reasonable range, for example, fleet depot, private and public charger stations, and vehicles with power generating capability. Based on the requester location, the requester's route, and the alternatives, net vehicle miles traveled (VMT) reduction may be estimated. Further, after the charging event, the net VMT reduction can be calculated. (If electricity source is not "stationary"). Based on the electricity source owner's location and planned route, net VMT addition to connecting with the requester is estimated. In addition, both a projection of emissions and actual fuel consumption and corresponding emissions can be computed. Additional metrics may be calculated, for example, an estimate of battery degradation and consequential life-cycle emissions impact. If an EV needing charging would have been stranded otherwise requiring a tow, emissions associated with that type of event may be included has having been avoided through our peer-to-peer network. The VMT reduction, energy savings, and other metrics are reported to the cloud storage and compute system for use by the original equipment manufacturer, applicable regulatory agencies, and both parties involved in the transaction.

Emissions might also include lifecycle emissions and environmental impacts. As a first example, a given power source may be from a known lifecycle pathway, which has measured $CO_2$, NOx, water, and land use. For example, if low $CO_2$ emissions are produced, but excessive water impacts on a region where water is a scarce resource, such a pathway may be less desirable. In certain regions or weather conditions, NOx has higher smog-formation potential, while another criteria emission might be less significant. If the electricity generation source has low $CO_2$ emissions, but high NOx in an EPA nonattainment region, this pathway might not be desirable. As a second example, if on-site solar array exists with battery storage, it may be zero emissions, but has certain life cycle impacts that might be greater or less than say a grid tie solar power system.

There may be a number of advantages to a peer-to-peer network as described herein. A first advantage may include user convenience. As a first example of this convenience, an EV fleet vehicle may prefer to avoid returning to the fleet depot for charging, which would cost unproductive time and increase VMT (for example, traffic, vehicle & battery degradation, and well-to-tank (WTT) emissions). As a second example of this convenience, an EV driver may not want to use a public EV station for personal, location, or distance-based reasons. A second advantage may include addressing scenarios where an unexpected need for charging may arise. For example, during a winter storm, residents may not have the means to find or request electricity sources like generators or neighbors' electricity-generating vehicles. As a second example of this type of scenario, a delivery van is too low on charge to reach a charging station. As a third example of this type of scenario, a family on a road trip in their EV may realize they need to charge and are in a region with no public EV charging stations, but a fellow EV or a neighborhood home could charge their vehicle. As a fourth example of this type of scenario, an EV driver may want to sort charging options to find those that are most environmentally friendly.

Figure 1:
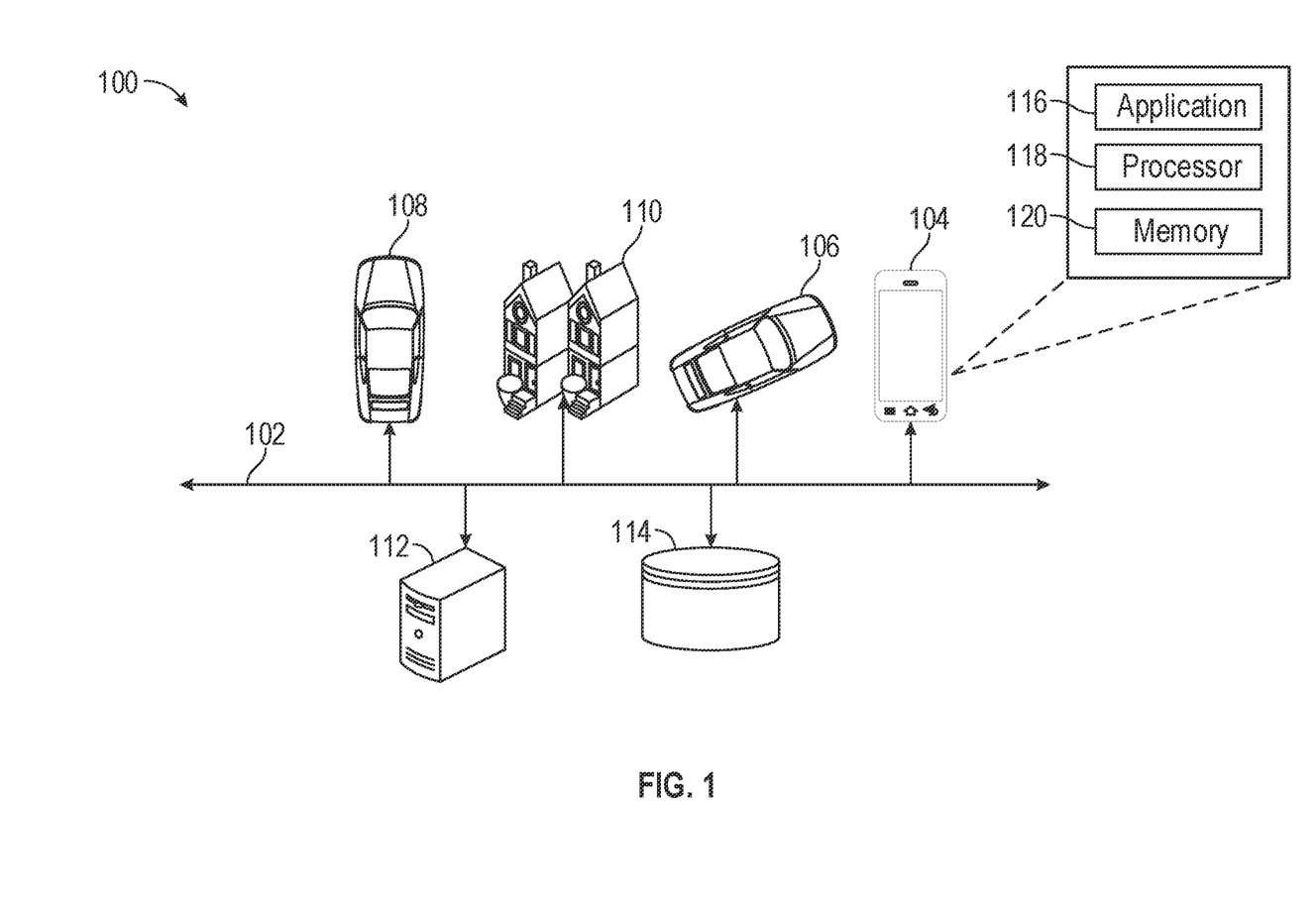
FIG. 1 illustrates an example system architecture, in accordance with one or more embodiments of the disclosure.

FIG. 1 illustrates an example system 100 architecture, in accordance with one or more embodiments of the disclosure. The system 100 may depict a peer-to-peer network 102 including one or more charging sources. For example, EV owners are installing their own connected charging stations in their homes, some vehicles offer a built-in generator electricity source, and EVs are introducing bi-directional charging capabilities In this manner, the peer-to-peer network 102 may include one or more vehicles (such as vehicle 106 and/or vehicle 108) and/or one or more charging sources associated with a home 110. These are merely examples of charging sources that may exist on the peer-to-peer network 102, however, and any other type of charging source may similarly exist on the peer-to-peer network 102. The one or more charging sources may be used to perform charging events. That is, the one or more charging sources may provide electricity flow to a user's vehicle that is low on battery, a home of a user, a generator, etc. These elements that may be provided the electricity flow from a charging source may generally be referred to herein as "devices" in some instances.

The system 100 may also be associated with one or more mobile devices 104 that may be used to provide a user (not depicted in the figure) access to the peer-to-peer network 102. A mobile device 104, for example, may include a smartphone. A mobile device 104 may similarly include a laptop computer, desktop computer, etc. The one or more mobile devices 104 may include an application 116 that may allow the user to schedule a charging event with one of the charging sources on the peer-to-peer network. To facilitate this, the application 116 may include a user interface (for example, such as the user interface 400 and/or any other user interface). The application 116 may also allow a user to perform any other operations described herein, such as view information about different charging sources, view emission information associated with a potential charging event, etc. A mobile device 104 may also include a processor 118 and memory 120. The mobile device may also include any of the elements described with respect to the machine 600 of FIG. 6 as well.

In some embodiments, the system 100 may also include one or more remote servers 112 and/or one or more databases 114. The one or more remote servers 112 may be used to perform any of the same operations as the application 116 of the one or more mobile devices 104 and/or any other operations described herein. The one or more databases 114 may be used to store any data captured or accessed.

Figure 2:
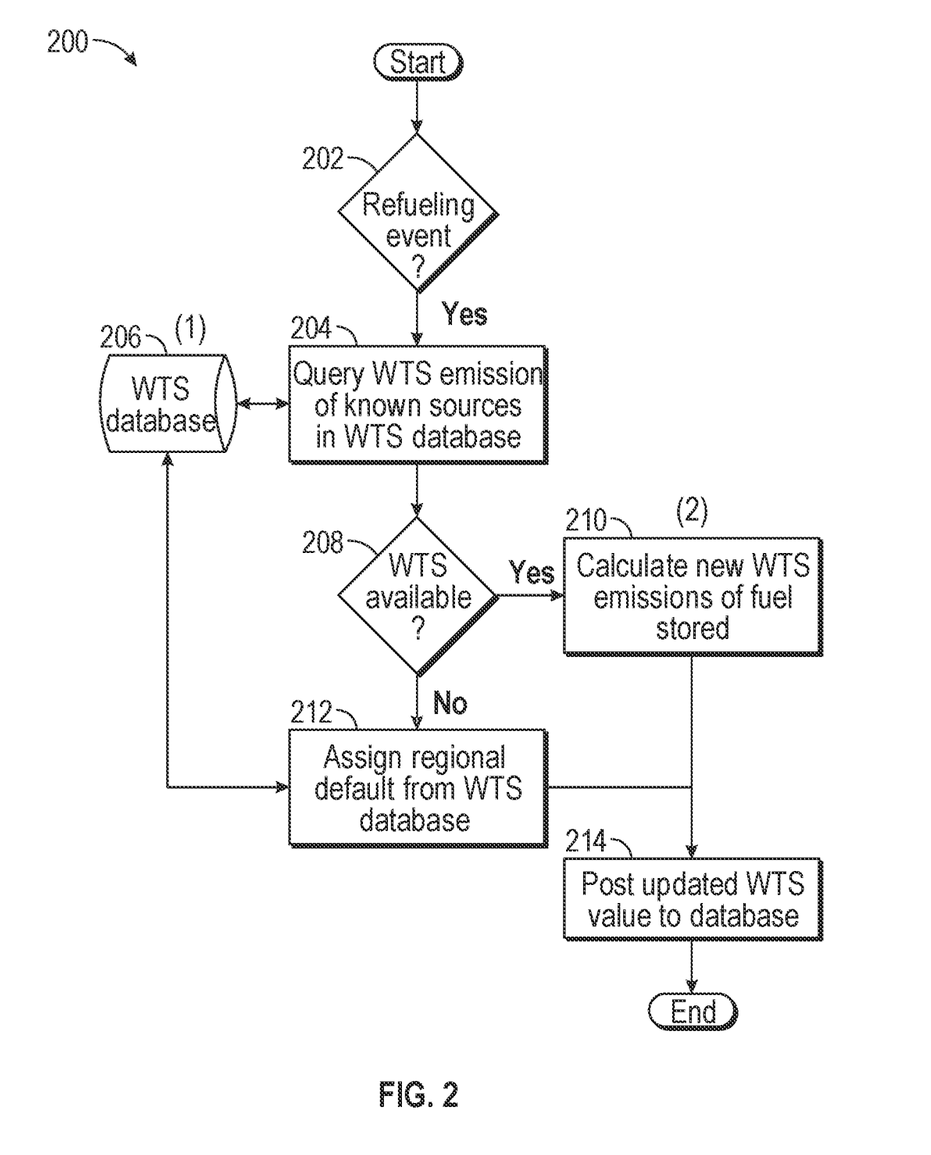
FIG. 2 illustrates an example flow diagram, in accordance with one or more embodiments of the disclosure.

FIG. 2 illustrates an example flow diagram 200, in accordance with one or more embodiments of the disclosure. Particularly, the flow diagram 200 may illustrate one method by which emissions that would result from a re-charging using a particular charging source may be determined. This first method may involve using well-to-storage emissions. In some cases, this method (and/or any other method that may be used to determine potential emissions resulting from a charging event) may be used to determine whether an available charging source may be scheduled to provide a charging event. For example, if it is determined through this method (and/or any other method described herein) that a charging event using the particular charging source would exceed an emissions threshold, then a user may be prevented from selecting that particular charging source to use in a charging event. For example, the user interface may simply not present that charging source as an available charging source, may present the charging source, but may indicate that a charging event may not be scheduled with that charging source, etc. Furthermore, in some cases, a user may still be allowed to schedule a charging event, but may be limited in some capacity to prevent the emissions from crossing the threshold. For example, the charging source may only be used for a limited amount of time, only some of the full power draw may be available, etc.

A refueling or charging station owner, or owner of a private connected charging station, may be able to upload information to a database on the fuel pathway corresponding to their fuel or electricity. If this information is unavailable, the database may also store default regional values such as US Department of Energy or national laboratory assumptions or CA ISO emissions estimates associated with the power grid at a given time and a given region. This information may be displayed in the mobile application for both existing public charging infrastructure (e.g. in an application as an additional data source for EV charging and fuel stations for other fuel types) and our proposed peer-to-peer electricity network. This will encourage users (and electricity source providers) to offer the greenest fuel pathways possible.

The flow diagram 200 may begin with condition 202, which may involve identifying a potential re-charging event. For example, this may involve a user selecting a particular charging source. However, in some cases, the emissions determinations may be made before any selection of a specific charging source is performed. In such cases, the condition 202 may simply involve a determination that a charging source is made available for selection (for example, the charging source is registered for use through the mobile device application by an owner of the charging source). Condition 202 may be followed by operation 204, which may involve querying WTS emissions of known sources in a WTS database 206. Condition 208 may involve a determination as to whether such WTS information is available. If so, condition 208 may be followed by operation 210. Otherwise, condition 208 may be followed by operation 212. Operation 210 may involve calculating new WTS emissions. Operation 212 may involve assigning regional default data from the WTS database. Both operation 210 and 212 may be followed by operation 214, which may involve posting updated WTS values to the WTS database 206.

Figure 3:
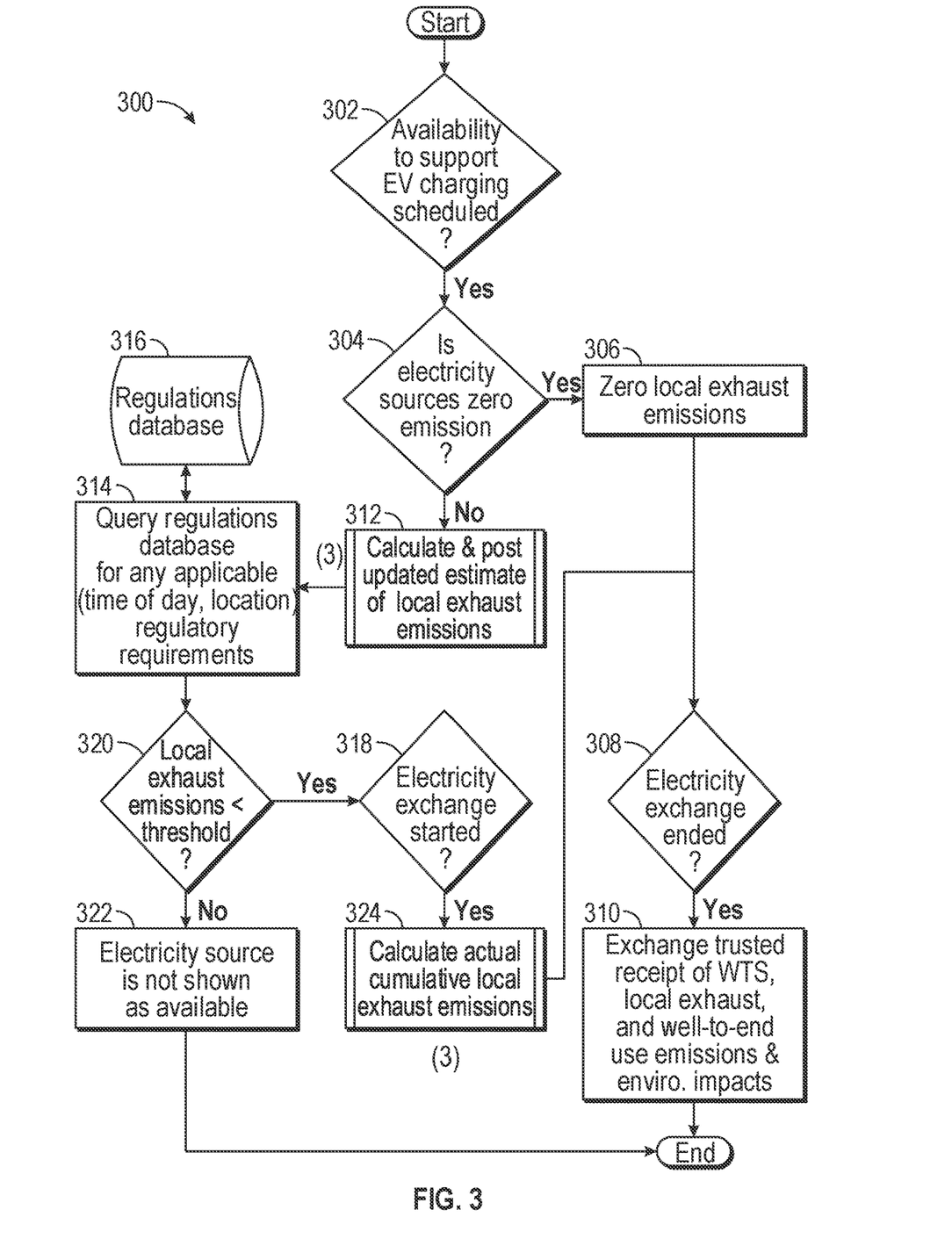
FIG. 3 illustrates an example flow diagram, in accordance with one or more embodiments of the disclosure.

FIG. 3 illustrates an example flow diagram 300, in accordance with one or more embodiments of the disclosure. Particularly, the flow diagram 300 may illustrate a second method by which emissions from a re-charging event may be determined. This second method may involve calculating local exhaust emissions.

These calculations will determine whether the electricity source is authorized given regulations that may be location or time-dependent. Pro Power Onboard is expected to be the most common example and will be referenced throughout this section; however, another anticipated source is any supplementary generator powering a home, for example, an on-site diesel generator for supplementary power. If the home is being powered by that generator at a given time and charging an EV, that pathway contains local exhaust emissions. For vehicles, in some cases, compliance may depend on whether there are any controls requirements that can be applied (E.g. PHEV supporting charging on EV mode only, or a bi-fuel vehicle supporting charging on the cleaner-burning fuel only). The following calculations should also be made during the powering event.

The flow diagram 300 may begin with condition 302. Condition 302 may involve a determination as to whether a particular charging source is available to be scheduled for a charging event. For example, the user interface (as exemplified in FIGS. 4A-4C) may indicate that a nearby vehicle is available to provide charge to a user vehicle that requires charging. Condition 302 may be followed by condition 304, which may involve a determination as to whether the charging source is a zero-emissions source. If it is determined through condition 304 that the charging source is a zero-emissions source, then the flow diagram 300 may proceed to operation 306, which may involve determining that there may be zero local exhaust emissions as a result of the scheduled charging event. If, however, it is determined through condition 304 that the electricity source is not a zero-emission source, then the flow diagram 300 may proceed to operation 312, which may involve calculating local exhaust emissions. In some cases, operation 312 may be performed in association with operation 314, which may involve querying a database 316 for any applicable regulatory requirements.

Following operation 312 and/or operation 314, the flow diagram 300 may proceed to condition 320. Condition 320 may involve a determination as to whether the determined local exhaust emissions would be less than a predetermined emissions threshold. If it is determined that the emissions would not be less than the threshold, then the flow diagram 300 may proceed to operation 322. However, if it is determined that the emissions would be less than the emissions threshold, then the flow diagram 300 may proceed to condition 318. Condition 318 may involve a determination as to whether electricity exchange has started (for example, whether a charging event has initiated). If this is the case, then the flow diagram 300 may proceed to operation 324, which may involve calculating actual emissions data based on the charging event. Following operation 324, the flow diagram 300 may proceed to condition 308 and operation 310.

Operation 322 may involve not presenting the particular electricity source as an option on the user interface. As aforementioned, operation 322 may not necessarily be limited to simply not presenting the charging source. As other examples, the user interface may still present the charging source, but may indicate that a charging event may not be scheduled with that charging source, etc. Furthermore, in some cases, a user may still be allowed to schedule a charging event, but may be limited in some capacity to prevent the emissions from crossing the threshold. For example, the charging source may only be used for a limited amount of time, only some of the full power draw may be available, etc.

It should be noted that the methods described as being used for determining emissions that may result from a charging event with a particular charging source (if a charging event with that charging source were to be scheduled) as described herein are not intended to be limiting. Any other methods for determining such emissions may also be used as well. As one additional non-limiting example, Well-to-Storage (WTS) emissions of current energy stored may be calculated using Equation 1 presented above, and/or any other emissions calculation may be performed.

Figure 4A:
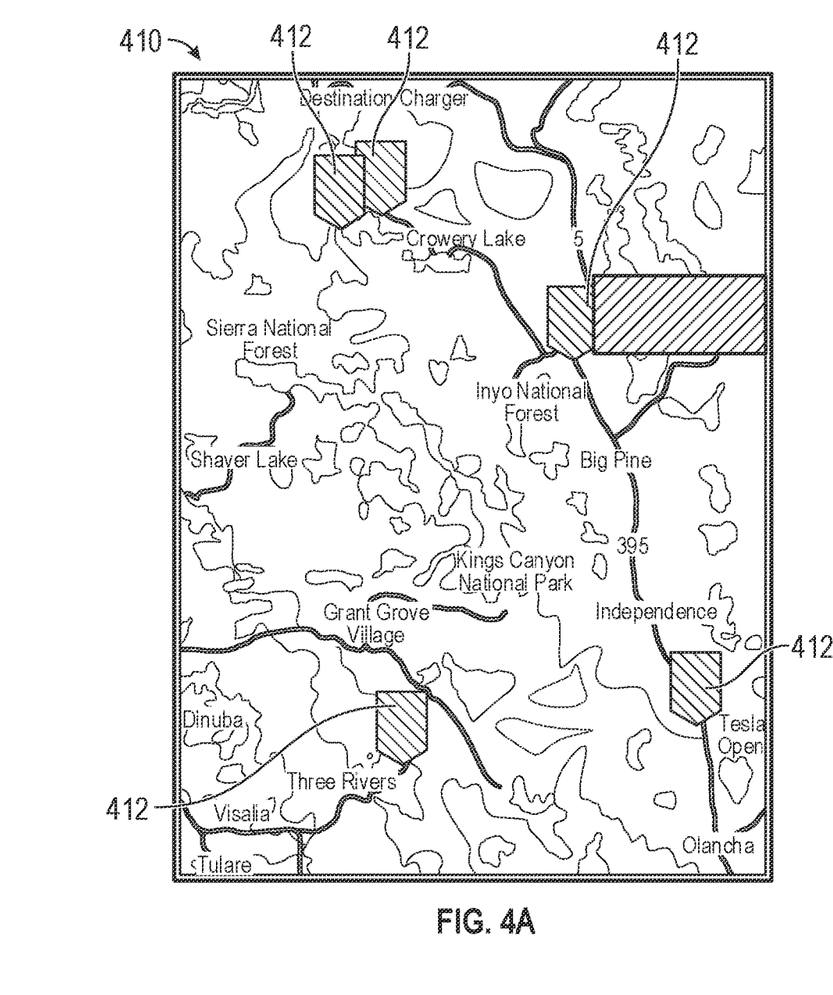
FIGS. 4A-4C illustrate example user interfaces, in accordance with one or more embodiments of the disclosure.
Figure 4B:
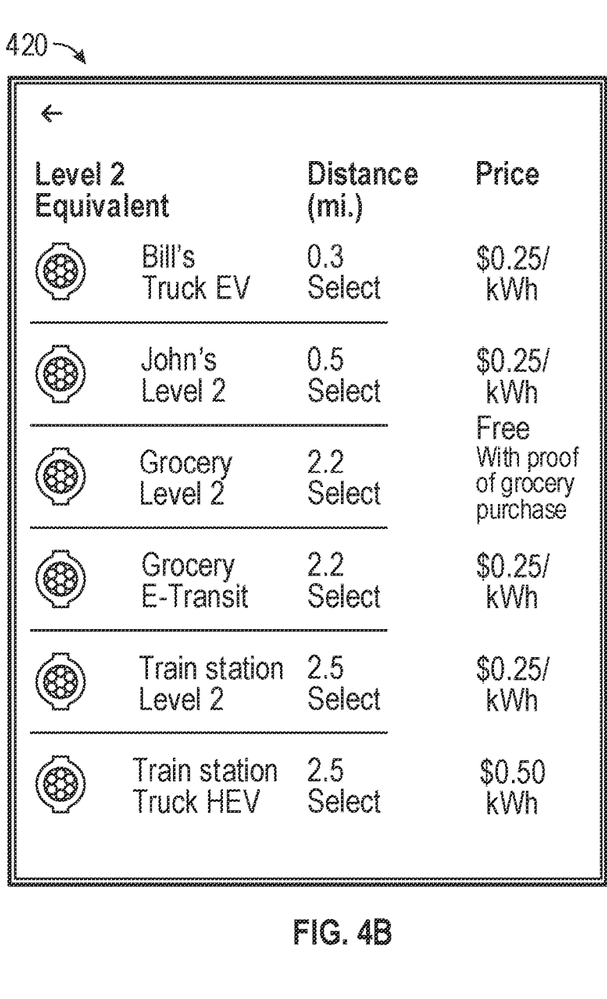
Figure 4C:
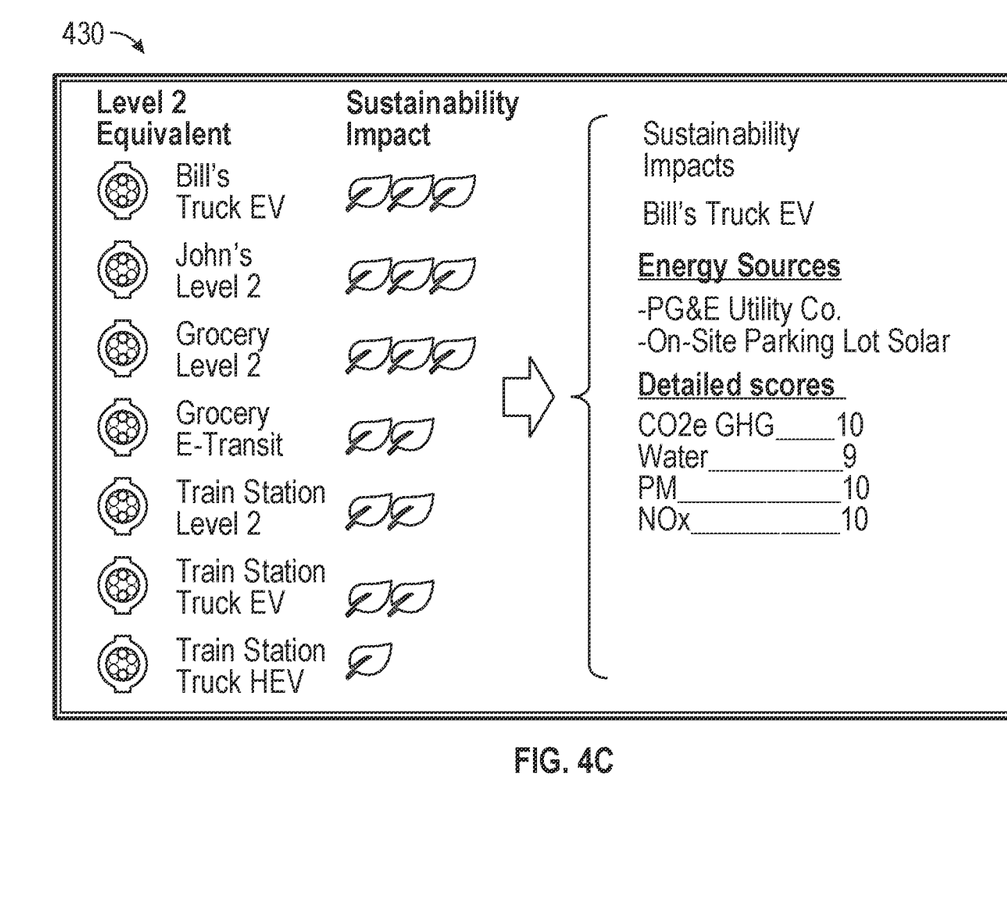

FIGS. 4A-4C illustrate example user interfaces (for example, user interface 410, user interface 420, and/or user interface 430), in accordance with one or more embodiments of the disclosure. These user interfaces (which may be referred to as "user interface 400" or "user interfaces 400" hereinafter) may, for example, be presented on a mobile device of a user and may allow the user to perform any actions associated with scheduling and performing a charging event as described herein. The user interfaces 400 may also be used to present any information relevant to charging events and/or scheduling charging events. That is, the different user interfaces (for example, user interface 410, user interface 420, and/or user interface 430) may all be presented through the application. However, this is not intended to be limiting, and the user interface 400 may be presented on any other type of device as well (for example, a desktop computer, laptop computer, etc.). Additionally, the users interfaces illustrated in FIGS. 4A-4C are not intended to be limiting in any way, and the user interfaces may also or alternatively present any other types of information in any form.

User interface 410 illustrates some of the information that may be presented to a user. Particularly, user interface 410 depicts a map including pins 412 associated with of one or more charging sources that exist in a vicinity of the user. The pins 412 may provide information about locations of charging sources nearby to the user. The pins 412 may also include any other relevant identifying information, such as the specific type of charging source that exists at the location. For example, a specific type of electric vehicle (EV). Any other types of information may be presented through the user interface 410 as well, including information that may not necessarily be depicted in the figure.

User interface 420 illustrates an additional example of the types of information that may be presented to a user. Particularly, user interface 420 also presents information associated with of one or more charging sources that exist in a vicinity of the user. However, the information may be presented in a list format rather than a map format. In this manner, more detailed information about different charging sources may be presented to the user. For example, more specific details about the type of charging source and the capabilities of the charging source may be presented. More specific location information may also be presented. Price information associated with using the charging source may also be presented as well. These are merely examples of types of information that may be presented, and any other types of information may be presented as well.

User interface 430 illustrates an additional example of the types of information that may be presented to a user. Particularly, user interface 430 may present emissions information associated with different charging sources.

Figure 5:
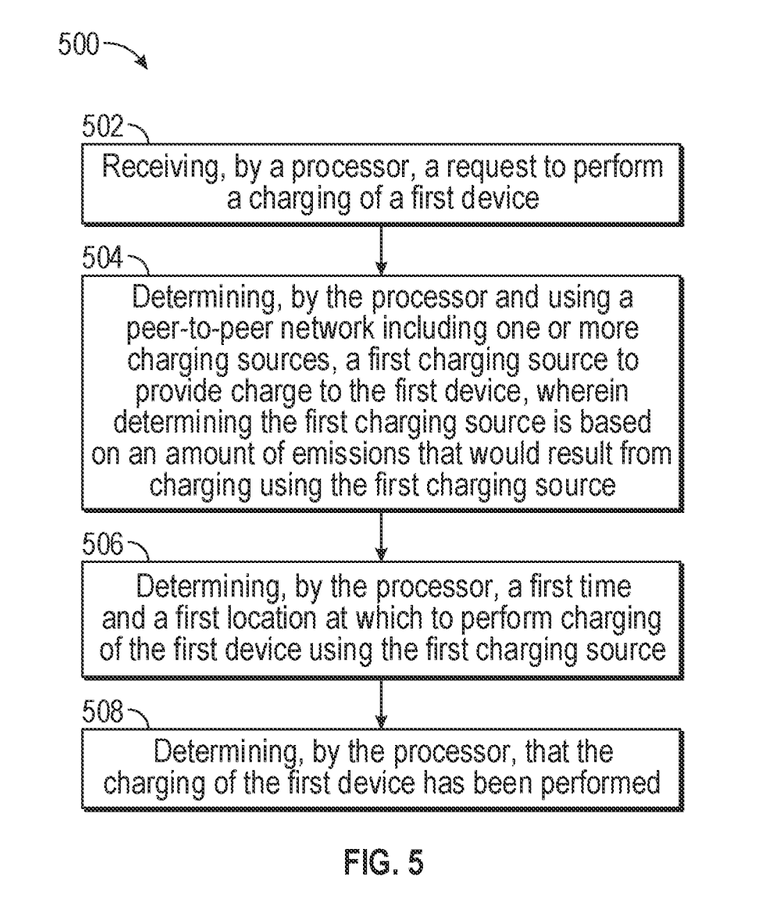
FIG. 5 illustrates an example method, in accordance with one or more embodiments of this disclosure.

FIG. 5 illustrates an example method 500, in accordance with one or more embodiments of this disclosure. At block 502, the method 500 may include receiving, by a processor, a request to perform a charging of a first device. At block 505, the method 500 may include determining, by the processor and using a peer-to-peer network including one or more charging sources, a first charging source to provide charge to the first device, wherein determining the first charging source is based on an amount of emissions that would result from charging using the first charging source. At block 506, the method 500 may include determining, by the processor, a first time and a first location at which to perform charging of the first device using the first charging source. At block 508, the method 500 may include determining, by the processor, that the charging of the first device has been performed.

Emissions may play a role in a multi-objective optimization with constraints, but the determination as to which charge sources to display and/or choose for performing a charging event may not necessarily be limited to being based on emissions. Examples of other metrics might include: vehicle miles travel (VMT) and corresponding energy consumed to reach the station, convenience (travel time and/or distance), expected charging time given output power vs. time available (e.g., If someone visiting a national park indicates they will hike for 8 hours, a longer charge time is okay; if someone else simply needs additional charge to reach a DC Fast charger, time is critical). If a local regulator does not allow internal combustion exhaust for EV charging due to a spare the air day, only zero emission options may be available.

In some embodiments, a "device" may refer to any physical element that may be charged using a charging source as described herein. For example, a device may include a vehicle, a home, a generator, and/or any other type of physical element that may receive a flow of electricity from a charging source.

In some embodiments, the first device is a vehicle, and wherein the first charging source is determined based on either: a manual selection of the charging source through a user interface, or an automatic determination based on one or more selection criteria. For example, in terms of a manual selection, a user may select an available charging source that is presented on a user interface (such as user interface 400). Alternatively, rather than a user making a manual selection of a charging source, the system may either automatically select an optimal charging source for the user and/or may automatically provide one or more suggested charging sources for the user to select from. In some cases, the automatic determination may be made using artificial intelligence, machine learning, or the like.

The selection criteria may be any criteria that may be relevant to selecting an optimal charging source. The selection criteria may include, for example, an availability of the first charging source, a location of the first charging source, a charging capability of the first charging source, or an amount of emissions that would result from charging using the first charging source. The selection criteria may also include any other criteria as well.

In some embodiments, the method 500 further comprises initiating an action to provide the first device physical access to the first charging source. If the charging source if a vehicle, for example, the action may involve unlocking the doors of the vehicle, allowing the user to start the vehicle, and/or performing any other actions that may be required to allow the user to use the charging source to perform the charging. As another example, if the charging source is located in a closed environment (such as a garage of another user's home), the garage door may be opened to allow the user access to the charging source. These are merely provided as examples, and any other actions may similarly be taken to provide the user any physical access that may be required to perform the charging using the charging source.

In some embodiments, determining the first charging source is based on an amount of emissions that would result from charging using the first charging source. In some cases, the amount of emissions may be determined using any methods described herein or otherwise (for example, methods associated with FIGS. 2-3 and/or any other methods described herein or otherwise).

In some embodiments, the method 500 may further comprise receiving data captured by one or more sensors during the charging of the first device. The method 500 may further comprise storing the data. In one embodiment, both parties involved in the transaction have sensors that can be leveraged to obtain information on the surrounding environment, including the presence of individual(s) and their actions. Such sensors may include camera, Radar, Lidar, sound and temperature, vehicle door sensors, etc. During a charge event, these timestamped sensor streams maybe recorded to be subsequently stored for a designated period for retrieval in the event of conflict. In one embodiment, entry of the user into a designated distance and time from the charger would automatically trigger relevant sensors to begin recording.

At each stage in the contract, determined by sensor data, enter a record (one example would be a Blockchain record) with the following as well as any records of an unexpected event. Electricity source listed as available for use by owner and authorized based on expected emissions. End user listed as requiring electricity source. Electricity source and end user match, and pricing contract is agreed on. Electricity source or end user meet. Charging event commences. Expected amount of energy consumption, emissions, and cost. Charging event ends. Computed actual amount of energy consumption, emissions, and cost. End user leaves location, as determined by GPS, facial recognition, or other known identification methods.

In some embodiments, the method 500 may further comprise determining, using a classification algorithm applied to the data, that an abnormal event has occurred in association with the charging. A classification of such a problem may trigger alerts to relevant authorities and relevant parties. In one embodiment, one or more means may exist for an individual present to alert an emergency. Examples include: a physical button, a voice command, a unique and discrete way of signaling an emergency only known to the individual, a mobile app icon, and more.

Figure 6:
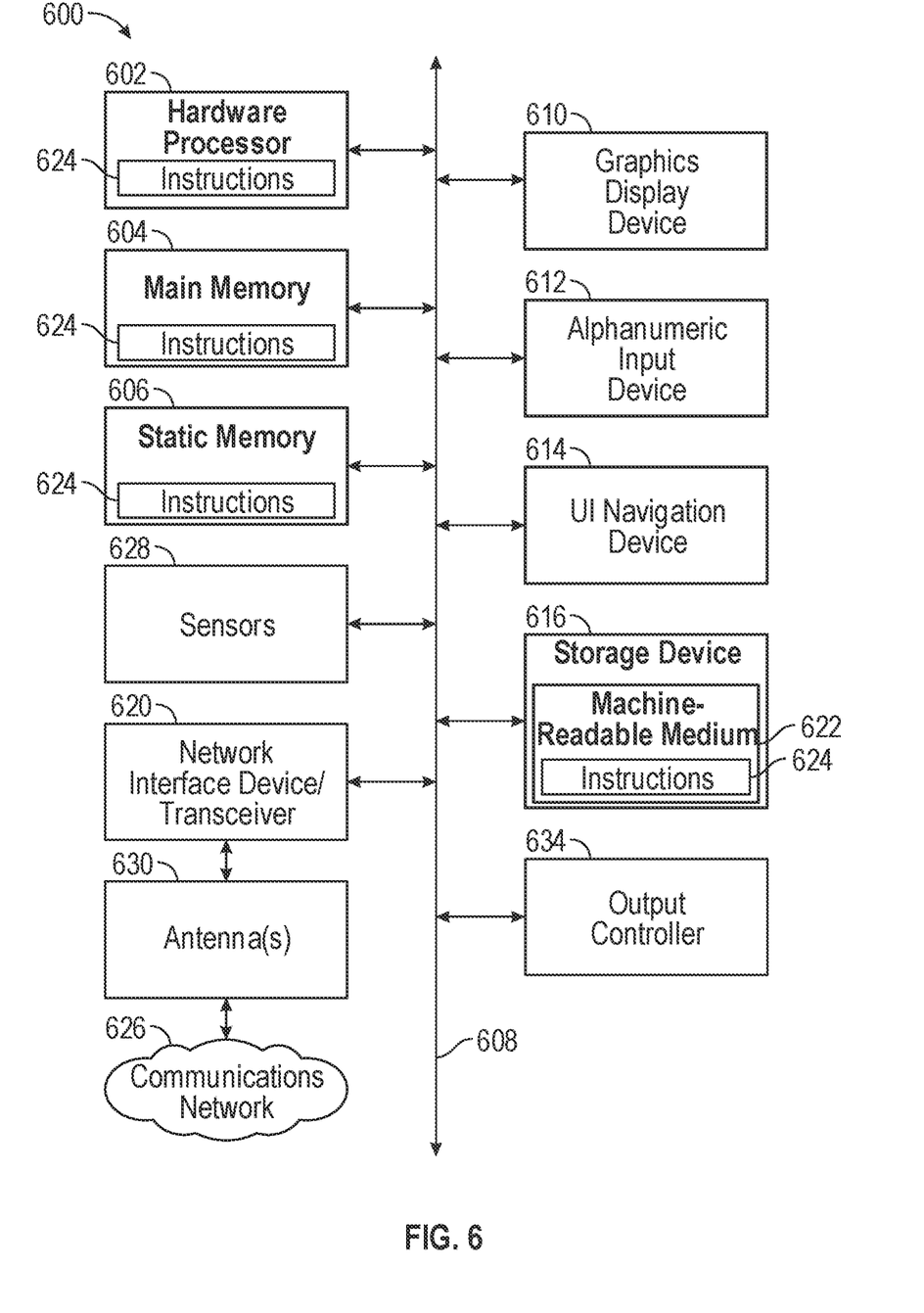
FIG. 6 illustrates an example of a computing system, in accordance with one or more embodiments of this disclosure.

FIG. 6 depicts a block diagram of an example machine 600 upon which any of one or more techniques (e.g., methods) may be performed, in accordance with one or more example embodiments of the present disclosure. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
   a processor; and
   a memory storing computer-executable instructions, that when executed by the processor, cause the processor to:
   receive a request to perform a charging of a first electric vehicle;
   determine, using a peer-to-peer network including one or more charging sources, a first charging source to provide charge to the first electric vehicle, wherein determining the first charging source is based on an amount of emissions that would result from charging using the first charging source;

determine a first time and a first location at which to perform charging of the first electric vehicle using the first charging source;

autonomously navigate, by the first electric vehicle, to the first location at the first time;

initiate an action to provide the first electric vehicle physical access to the first charging source; and determine that the charging of the first electric vehicle has been performed.

2. The system of claim 1, wherein the first charging source is determined based on either: a manual selection of the first charging source through a user interface, or an automatic determination based on one or more selection criteria.

3. The system of claim 2, wherein the one or more selection criteria include at least one of: an availability of the first charging source, a location of the first charging source, a charging capability of the first charging source, or an amount of emissions that would result from charging using the first charging source.

4. The system of claim 1, wherein the amount of emissions is based on well-to-storage emissions and/or local exhaust emissions.

5. The system of claim 1, wherein the computer-executable instructions further cause the processor to:

receive data captured by one or more sensors during the charging of the first electric vehicle; and store the data.

6. The system of claim 5, wherein the computer-executable instructions further cause the processor to:

determine, using a classification algorithm applied to the data, that an abnormal event has occurred in association with the charging.

7. The system of claim 1, wherein the computer-executable instructions further cause the processor to:

autonomously perform the charging of the first electric vehicle using at least one of: one or more sensors of the first electric vehicle or the first charging source.

8. A method comprising:

receiving, by a processor, a request to perform a charging of a first electric vehicle;

determining, by the processor and using a peer-to-peer network including one or more charging sources, a first charging source to provide charge to the first electric vehicle, wherein determining the first charging source is based on an amount of emissions that would result from charging using the first charging source;

determining, by the processor, a first time and a first location at which to perform charging of the first electric vehicle using the first charging source;

autonomously navigating, by the first electric vehicle, to the first location at the first time;

receiving data captured by one or more sensors during the charging of the first electric vehicle; and determining, using a classification algorithm applied to the data, that an abnormal event occurs in association with the charging; and determining, by the processor, that the charging of the first electric vehicle has been performed.

9. The method of claim 8, wherein the first charging source is determined based on either: a manual selection of the first charging source through a user interface, or an automatic determination based on one or more selection criteria.

10. The method of claim 9, wherein the one or more selection criteria include at least one of: an availability of the first charging source, a location of the first charging source, a charging capability of the first charging source, or an amount of emissions that would result from charging using the first charging source.

11. The method of claim 8, further comprising initiating an action to provide the first electric vehicle physical access to the first charging source.

12. The method of claim 8, wherein the amount of emissions is based on well-to-storage emissions and/or local exhaust emissions.

13. The method of claim 8, further comprising:

receiving data captured by one or more sensors during the charging of the first electric vehicle; and storing the data.

14. The method of claim 13, further comprising:

determining, using a classification algorithm applied to the data, that an abnormal event has occurred in association with the charging.

15. A non-transitory computer-readable medium storing computer-executable instructions, that when executed by a processor, cause the processor to:

receive a request to perform a charging of a first electric vehicle;

determine, using a peer-to-peer network including one or more charging sources, a first charging source to provide charge to the first electric vehicle, wherein determining the first charging source is based on at least one of: a distance to the first charging source, a charging time associated with the first charging source, or an amount of emissions that would result from charging using the first charging source, wherein the amount of emissions is based on at least one of: well-to-storage emissions or local exhaust emissions;

determine a first time and a first location at which to perform charging of the first electric vehicle using the first charging source;

autonomously navigate, by the first electric vehicle, to the first location at the first time; and determine that the charging of the first electric vehicle has been performed.

16. The non-transitory computer-readable medium of claim 15, wherein the first charging source is determined based on either: a manual selection of the first charging source through a user interface, or an automatic determination based on one or more selection criteria.

17. The non-transitory computer-readable medium of claim 16, wherein the one or more selection criteria include at least one of: an availability of the first charging source, a location of the first charging source, a charging capability of the first charging source, or an amount of emissions that would result from charging using the first charging source.

18. The non-transitory computer-readable medium of claim 15, wherein the computer-executable instructions further cause the processor to initiate an action to provide the first electric vehicle physical access to the first charging source.

19. The non-transitory computer-readable medium of claim 15, wherein the amount of emissions is based on well-to-storage emissions and/or local exhaust emissions.

20. The non-transitory computer-readable medium of claim 15, wherein the computer-executable instructions further cause the processor to:
   receive data captured by one or more sensors during the charging of the first electric vehicle; and
   store the data.

* * * * *